(12) United States Patent
Mohamadi et al.

(10) Patent No.: US 8,358,234 B2
(45) Date of Patent: Jan. 22, 2013

(54) DETERMINATION OF HOSTILE INDIVIDUALS ARMED WITH WEAPON, USING RESPIRATION AND HEARTBEAT AS WELL AS SPECTRAL ANALYSIS AT 60 GHZ

(75) Inventors: Farrokh Mohamadi, Irvine, CA (US); Mikko Oijala, Newport Beach, CA (US); Mohsen Zolghadri, Newport Beach, CA (US)

(73) Assignee: Tialinx, Inc., Newport Beach, CA (US)

( * ) Notice: Subject to any disclaimer, the term of this patent is extended or adjusted under 35 U.S.C. 154(b) by 357 days.

(21) Appl. No.: 12/732,163

(22) Filed: Mar. 25, 2010

(65) Prior Publication Data

US 2011/0025547 A1 Feb. 3, 2011

Related U.S. Application Data

(60) Provisional application No. 61/164,855, filed on Mar. 30, 2009, provisional application No. 61/239,752, filed on Sep. 3, 2009, provisional application No. 61/163,742, filed on Mar. 26, 2009.

(51) Int. Cl.
*G01S 13/00* (2006.01)

(52) U.S. Cl. .......................................... 342/28; 342/22

(58) Field of Classification Search .................... 342/22, 342/27–28
See application file for complete search history.

(56) References Cited

U.S. PATENT DOCUMENTS

| | | | |
|---|---|---|---|
| 7,804,442 B2 * | 9/2010 | Ammar | 342/22 |
| 2006/0170584 A1 * | 8/2006 | Romero et al. | 342/22 |
| 2008/0074307 A1 * | 3/2008 | Boric-Lubecke et al. | 342/28 |
| 2010/0177968 A1 * | 7/2010 | Fry et al. | 382/224 |

* cited by examiner

*Primary Examiner* — Timothy A Brainard
(74) *Attorney, Agent, or Firm* — Haynes and Boone, LLP

(57) ABSTRACT

A system includes a plurality of radar units configured to provide scan data to a network; a signal processing and imaging module connected to the network and configured to receive the scan data, identify a target, and determine a type of the target based on a radar profile of the target; and a display unit in communication with the signal processing and imaging module and configured to provide a tracking display of the target position and type. A method includes scanning an inhabitable area using a plurality of radar detector units to produce scan data; processing the scan data to construct a digitized representation of a target in the inhabitable area; using recovered information of the target to differentiate between a live person, an animal or an object as the target type; and displaying the target type and position on an image display.

15 Claims, 9 Drawing Sheets

DETERMINATION OF HOSTILE INDIVIDUALS ARMED WITH WEAPON, USING RESPIRATION AND HEARTBEAT AS WELL AS SPECTRAL ANALYSIS AT 60 GHZ

CROSS REFERENCE TO RELATED APPLICATIONS

This application claims the benefit of U.S. Provisional Application No. 61/164,855, filed Mar. 30, 2009, and U.S. Provisional Application No. 61/239,752, filed Sep. 3, 2009, and U.S. Provisional Application No. 61/163,742, filed Mar. 26, 2009, all of which are hereby incorporated by reference.

BACKGROUND

The present disclosure generally relates to radio frequency (RF) detection and ranging (RADAR) and, more particularly, to surveillance systems capable of discriminating living individuals from inanimate objects and detecting whether an individual may be carrying an object of interest such as a concealed weapon.

Portable, hand-held radars have been used for detection of hidden objects, e.g., objects such as weapons hidden behind a wall of a building. Such technology holds promise for use in situations where surveillance of an inhabitable area from behind a building wall may be desired, for example, for protection of an office space, with the detection system located inside the office, from individuals having access to hallways or areas nearby but outside the office. In some situations, e.g., police work, military combat scenarios, or fire and rescue situations, it may be desirable to be able to detect living individuals, and various objects that may be in their possession using a portable, hand-held radar system from outside a building, for example, occupied by the individuals.

SUMMARY

According to one embodiment, a system includes a plurality of radar units configured to provide scan data to a network; a signal processing and imaging module connected to the network and configured to receive the scan data, identify a target, and determine a type of the target based on a radar profile of the target; and a display unit in communication with the signal processing and imaging module and configured to provide a tracking display of the target position and type.

According to another embodiment, a method includes scanning an inhabitable area using a plurality of radar detector units to produce scan data; processing the scan data to construct a digitized representation of a target in the inhabitable area; using recovered information of the target to differentiate between a live person, an animal or an object as the target type; and displaying the target type and position on an image display.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. Like reference numerals are used to identify like elements illustrated in one or more of the figures.

DETAILED DESCRIPTION

In accordance with one or more embodiments of the present invention, systems and methods disclosed herein include a very high frequency, e.g., 60 Giga Hertz (GHz) ultra-wideband (UWB) radar imaging system that identifies and differentiates multiple individuals, tracks the individuals' motion and displays the tracking in real time, and identifies objects, such as concealed weapons, that may be carried by any of the individuals.

Such an ultra-wideband radar imaging system may be valuable for surveillance to protect an inhabitable area—an office space or living space, for example—with the detection system located inside the space, from individuals behind a building wall and having access to hallways or areas nearby but outside the space. A similar but alternative scenario may be one in which the space under surveillance is protected by a covert detection system hidden from the space, located outside the space behind a wall. An ultra-wideband radar imaging system may also be useful, for example, to persons outside a building (e.g., fire, rescue workers, military, police, or others) requiring surveillance or intelligence data (e.g., detection of living persons and various objects that may be in their possession) regarding individuals occupying the building when entering the building is not practical, permissible, or safe. For an example that has received attention recently, such a system could be useful to rescue workers for locating earthquake victims trapped inside damaged buildings.

Figure 1:
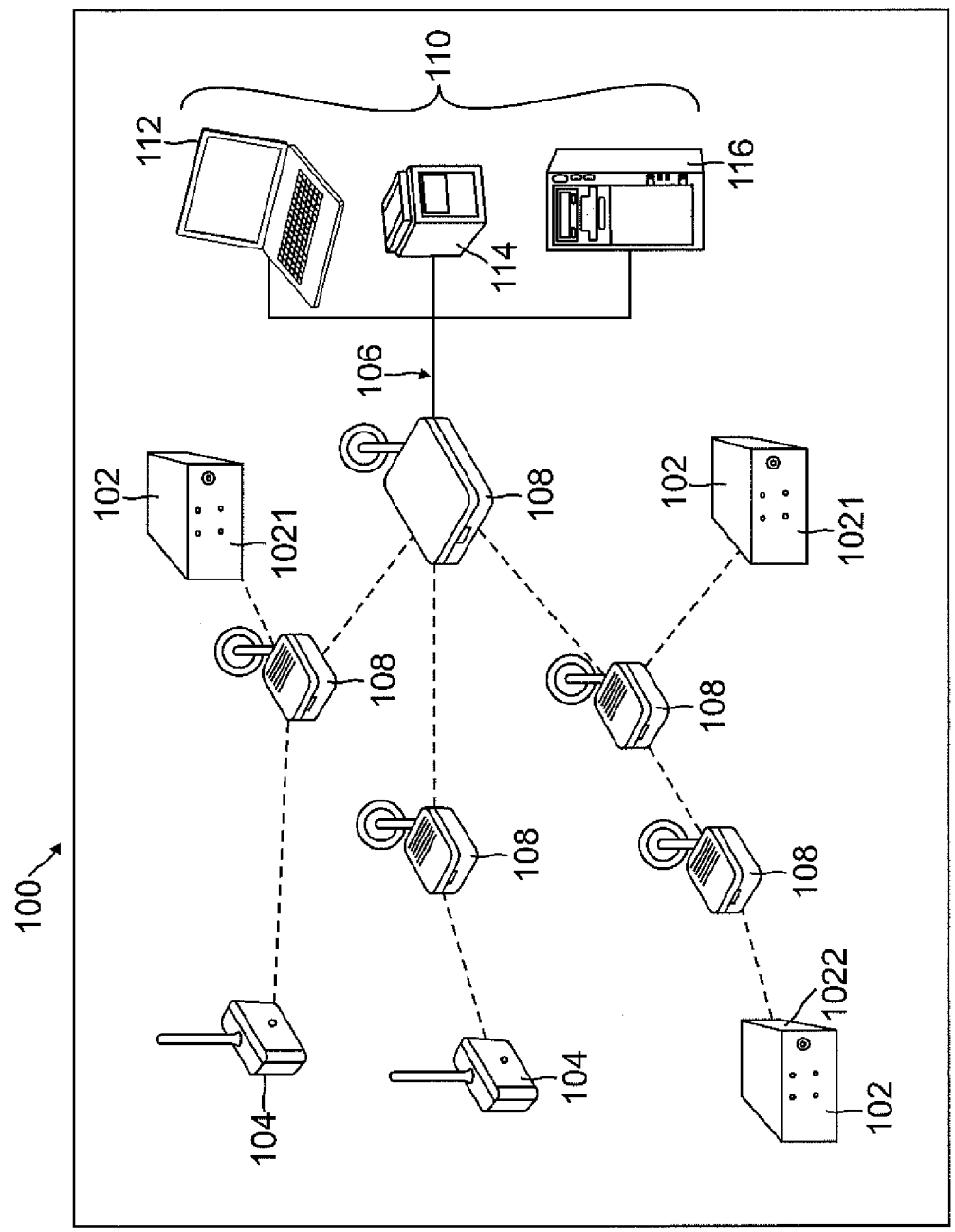
FIG. 1 is a system diagram illustrative of one example of a system architecture for an RF imaging system in accordance with one embodiment.

FIG. 1 illustrates an RF imaging system 100 according to one or more embodiments. RF imaging system 100 may include a number of radar units 102, which may be ultra-wideband 60 GHz radar units. Among radar units 102, some radar units, e.g., radar units 1021, may operate in a covert motion detector mode, and other radar units, e.g., radar unit 1022 may operate in a covert RF imaging mode. RF imaging system 100 may include a number of complementary sensors 104. Complementary sensors 104 may be, for example, additional radar units 102, infrared motion detectors, or video cameras. Radar units 102 and complementary sensors 104 may communicate via a communication network 106, which may be, for example, an enterprise network. Communication network 106 may comprise, for example, a number of routers 108, which may be wireless routers, as shown in FIG. 1. Radar units 102 and complementary sensors 104 may communicate via wireless communication network 106 with a computer system 110. Computer system 110 may include a personal computer 112, for example, a mass storage unit 114, in communication with and accessible by the personal computer 112, and a server machine 116, also in communication with mass storage unit 114 and personal computer 112, and accessible by personal computer 112. Wireless communication network 106 allows flexibility in placement of the radar units 102, in particular radar detector units 1021 and complementary sensors 104 of system 100. Each component of system 100 may be geo-located by applications of a GPS (global positioning system) or gyro-based system. The entire RF imaging system 100, including the cluster of sensors (e.g., detector units 1021, sensors 104) may be synchronized (e.g., using the GPS clock signal) and synchronized radar scan data and sensor data may be taken from various angles and locations of the radar detectors 102 and sensors 104. Such geo-locating and synchronizing of units may enable highly accurate positioning and tracking of targets, such as by using triangulation of target data, for example.

Figure 2:
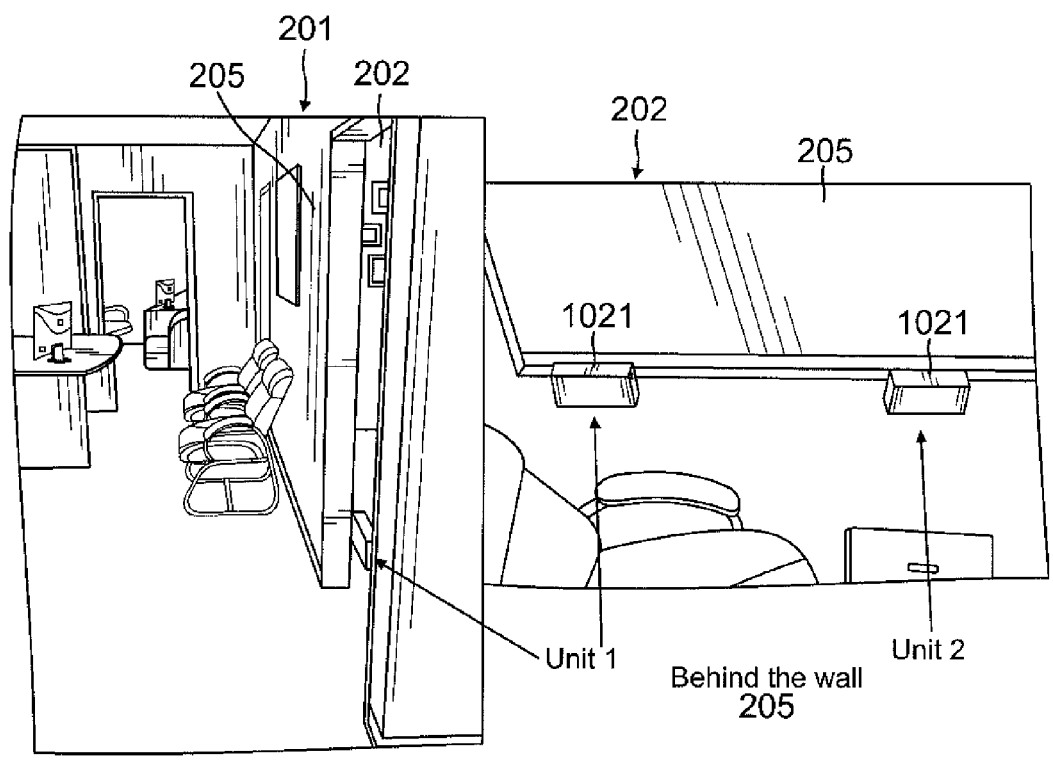
FIG. 2 is a perspective diagram illustrating an example of a physical layout for surveillance in an office setting of RF imaging system components in accordance with an embodiment.

FIG. 2 illustrates an example of a physical layout of components of RF imaging system 100 for surveillance of an inhabitable area, the particular example showing an office setting. As seen in FIG. 2, RF imaging system 100 may be used for surveillance of office space 201 from office space 202 with placement of radar detector units 1021 behind wall 205, hidden from space 201. For monitoring RF imaging system 100, personal computer 112 may be located in space 202 or anywhere that is within range of wireless communication network 106 connectivity. Thus, flexibility of operation is provided, for example, for covert surveillance and monitoring of space 201. The same flexibility for monitoring locations may be useful for other applications of RF imaging system 100, such as the examples provided above. For example, system 100 can be installed inside or outside a building or used as a portable interrogator in a military setting, for example, in a search and track mission to detect and track individuals and weapons hidden behind walls. System 100 can also be augmented with complementary sensors 104—such as infrared (IR) or video cameras—for thermal and visual inspection.

Referring now to both FIG. 1 and FIG. 2, system 100 may include radar detector units 1021 that may provide raw data from scanning space 201 to a signal processing and imaging module (included in radar imaging unit 1022, for example) that may include a computer processor. The ultra-wideband radar detector units 1021 and radar imaging unit 1022 may send very narrow pulses and perform required signal processing on the response provided by the reflected pulses (also referred to as "scan data") to construct a digitized representation of a target (e.g., an individual entering or occupying space 201). The radar transmitter of each unit 102 (including units 1021, 1022) may emit rapid wideband radar pulses, each pulse of approximately 100-200 pico-second duration. The radars (e.g., units 102) of system 100 may, for example, transmit 100 pico-second Gaussian pulses at a 5 GHz or 60 GHz center frequency. These micro-wave or millimeter-wave pulses can penetrate glass, wood, soil, concrete, dry wall, and bricks—with varying attenuation constant, depending on the material. The pulses may be repeated at a chosen pulse repetition frequency (PRF). By choosing a PRF in the range of 1-10 MHz and appropriate average transmitter power, a surveillance range of about 50-500 feet (ft) can generally be achieved. To illustrate: using the short duration pulses just described, for example, and a PRF at about 10 MHz, surveillance in a range of about 0-50 ft may be accomplished; and with a PRF at about 1 MHz, surveillance in a range of about 450-500 ft may be accomplished.

An array of dipole, patch, or spiral antennas may be employed to enhance antenna directionality and enable beam forming. For example, radar units 102 may achieve a range resolution of about 2 mm. Using an integrated antenna module with 1024 antenna elements, radar units 102 may achieve a beam width less than about 2 degrees. In the receiver of each radar unit 102, a correlator pulse detector circuit may be employed to identify reflections of the pulses. Amplitude and delay information may be extracted and processed in an integrated signal processor, which may be included, for example, in the signal processing and imaging module of one of the radar units 102, e.g., RF imaging unit 1022. Image construction algorithms may be implemented using digital signal processing (DSP) and may yield a two-dimensional (2D) or three-dimensional (3D) image of individuals and objects in the inhabitable area subjected to surveillance, e.g., space 201, on a display screen such as that provided by personal computer 112 of system 100.

Figure 3:
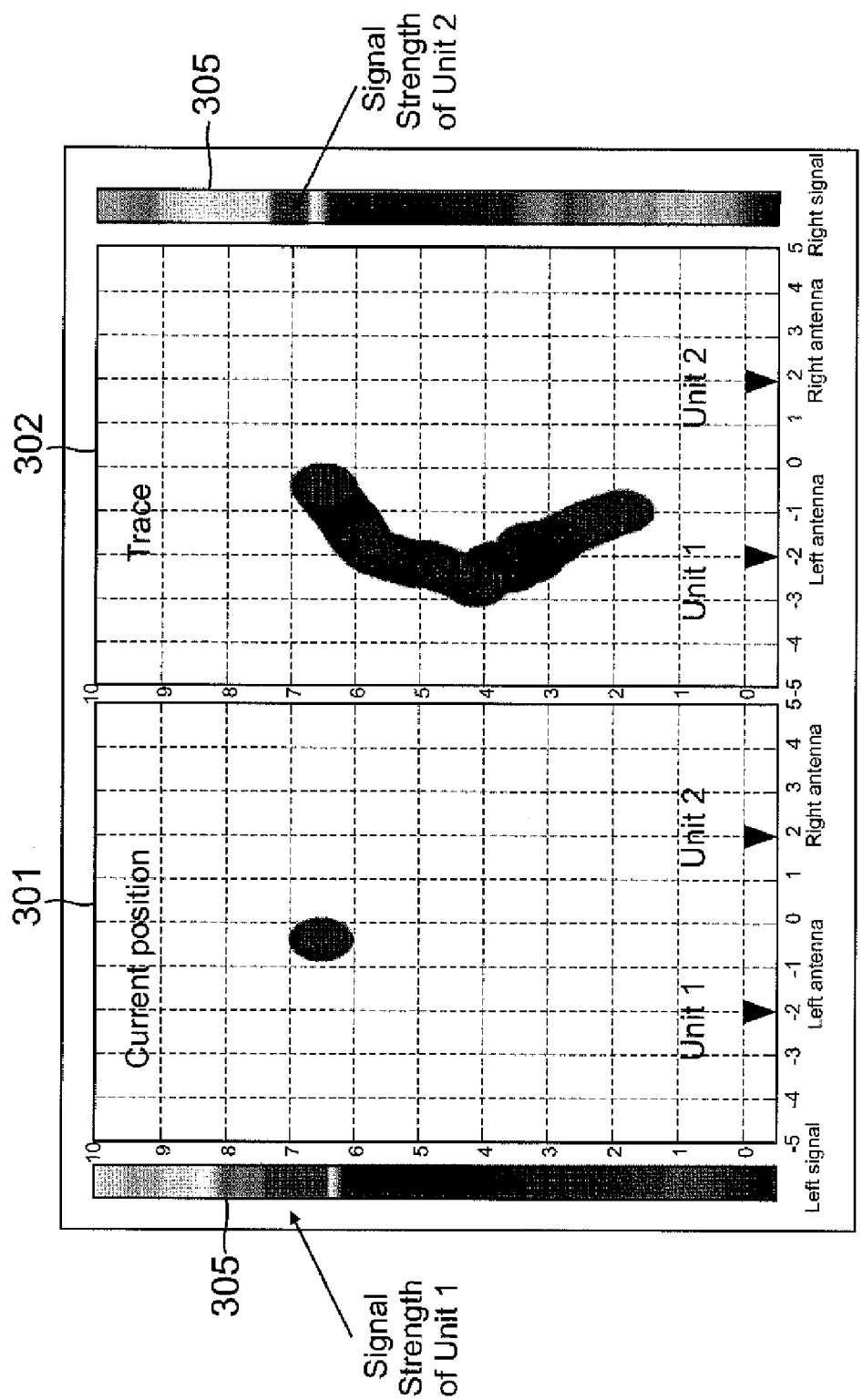
FIG. 3 is an example of a system interface display for providing surveillance information to a user from an RF imaging system in accordance with an embodiment.

FIG. 3 illustrates an example of a system interface display 300 for providing surveillance information to a user from RF imaging system 100. The display may be presented, for example, on a monitor of personal computer 112 of computer system 110. For the example shown in FIG. 3, the image may be constructed from information provided by the two sensor units 1021 (labeled "Unit 1" and "Unit 2") shown in FIG. 2. The images shown in display 300 may be oriented relative to the actual space under surveillance in accordance with the locations of Unit 1 and Unit 2, the positions of which are indicated in the display 300—in the present example, at the bottom of display 300. Display portion 301 of display 300 shows, for example, the current position of a "target", e.g., person or object of interest in the space under surveillance, relative to the locations of Unit 1 and Unit 2 sensors 1021. Display portion 302 of display 300 may show, for example, a trace or track of the changing positions of the target shown in display portion 301, relative to the locations of Unit 1 and Unit 2 sensors 1021. The target tracking and trace of target movement shown in display portion 302 may be provided in real time, as described below with reference to FIG. 6 and FIG. 7. In addition, graphical indications 305 of signal strength for each of the two units may be provided.

Figure 4A:
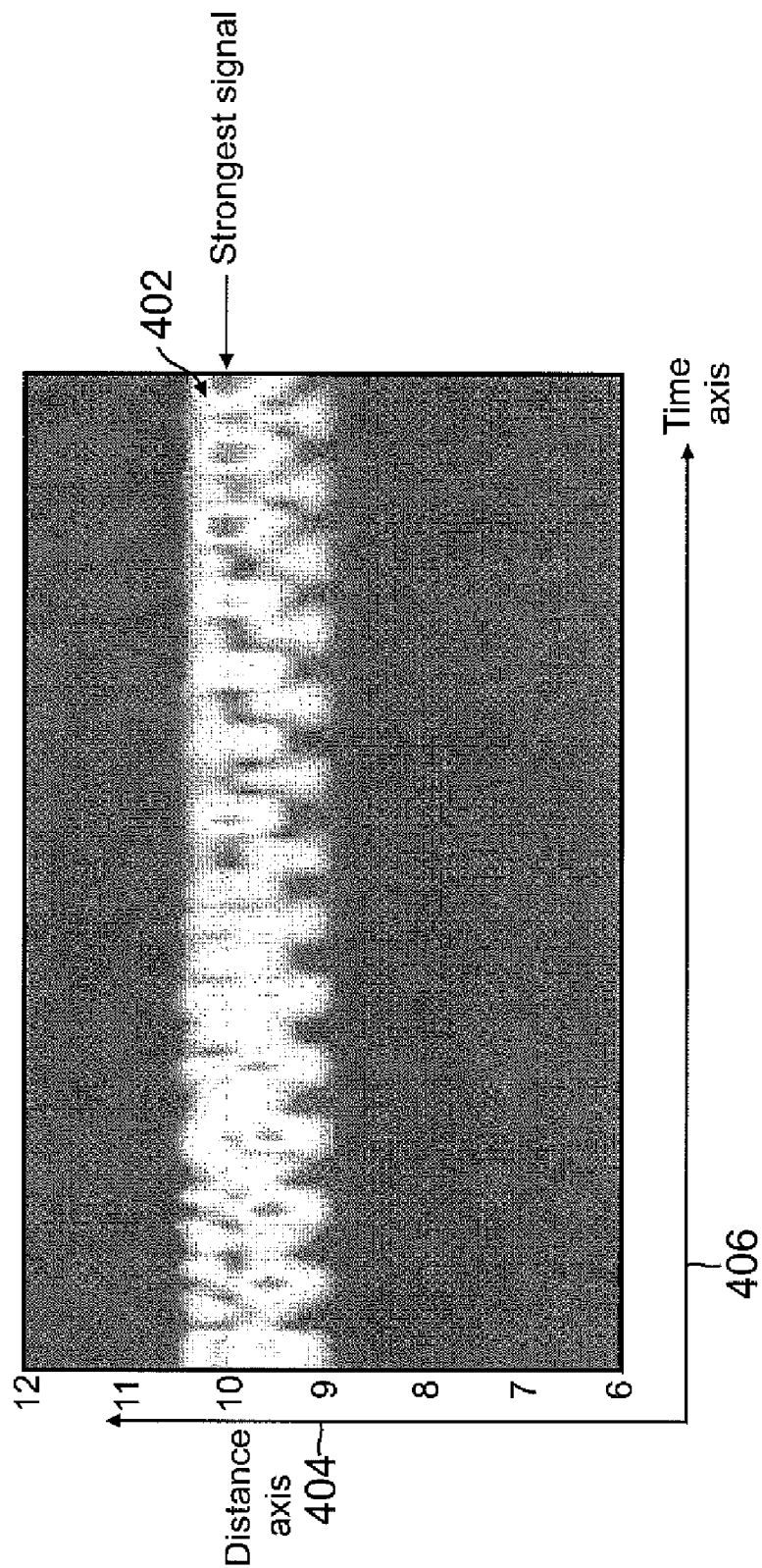
FIG. 4A is a time domain display showing radar scan ranging samples taken over a time period of a few seconds that may be used to indicate target movement or biometric data to a user of an RF imaging system in accordance with an embodiment.

FIG. 4A is a time domain display provided by RF imaging system 100 showing radar scan ranging samples taken over a time period of a few seconds that may be used to indicate target movement or biometric data. FIG. 4A shows a scan lasting a few seconds of a person sitting approximately 10 ft away from a radar unit 102. Scan samples 402 may form a distinct pattern of a heartbeat that can be observed at a distance of about 10 ft. For example, the distance of a sample 402 along the distance axis 404 may vary from sample to sample as time progresses along time axis 406. The scan rate for the example of FIG. 4A is approximately 7.5 scans/second. The scan rate for the example may allow analyzing the signal frequencies up to about 3.75 Hz, a frequency which most human heartbeats should be less than so as to avoid aliasing in the sampling. The scan may be differential, e.g., the data displayed and analyzed may be a difference between a current scan and a fixed reference background scan. Other biometric data as well as heartbeat may detected or used for surveillance, and the scan rate may be adjusted accordingly. For example, respiration may be detected, e.g., based on diaphragm movement; and bodily or limb movement such as hand or foot movements may be detected.

Figure 4B:
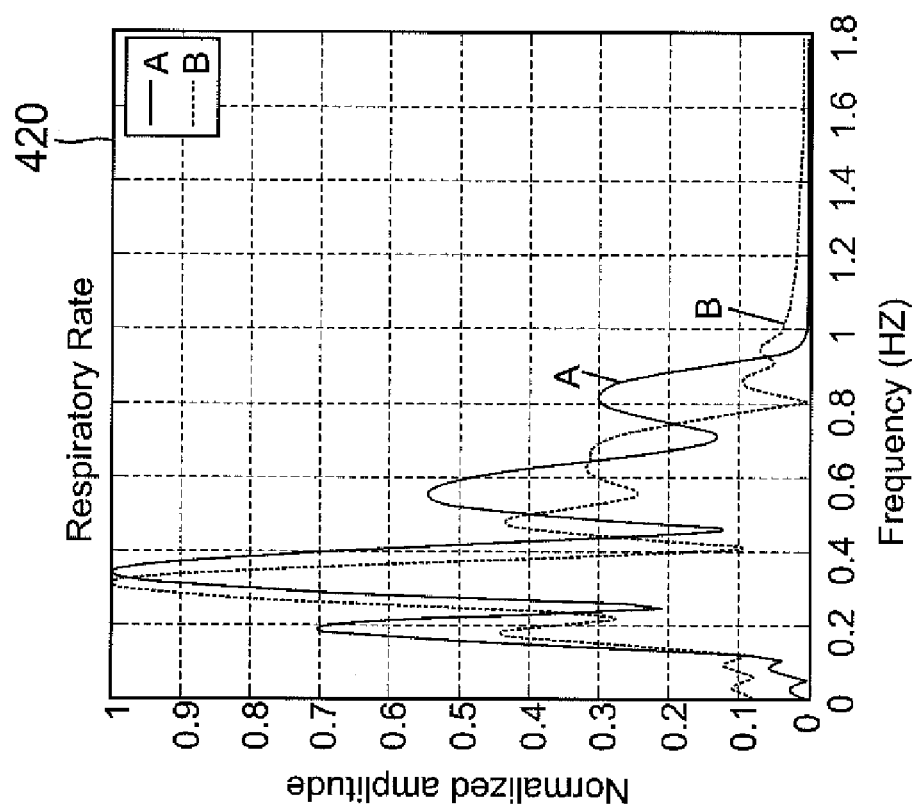
FIG. 4B is a set of frequency domain signal strength graphs illustrating a capability for discriminating heartbeat and respiration of live individuals by an RF imaging system in accordance with an embodiment.
Figure 4B:
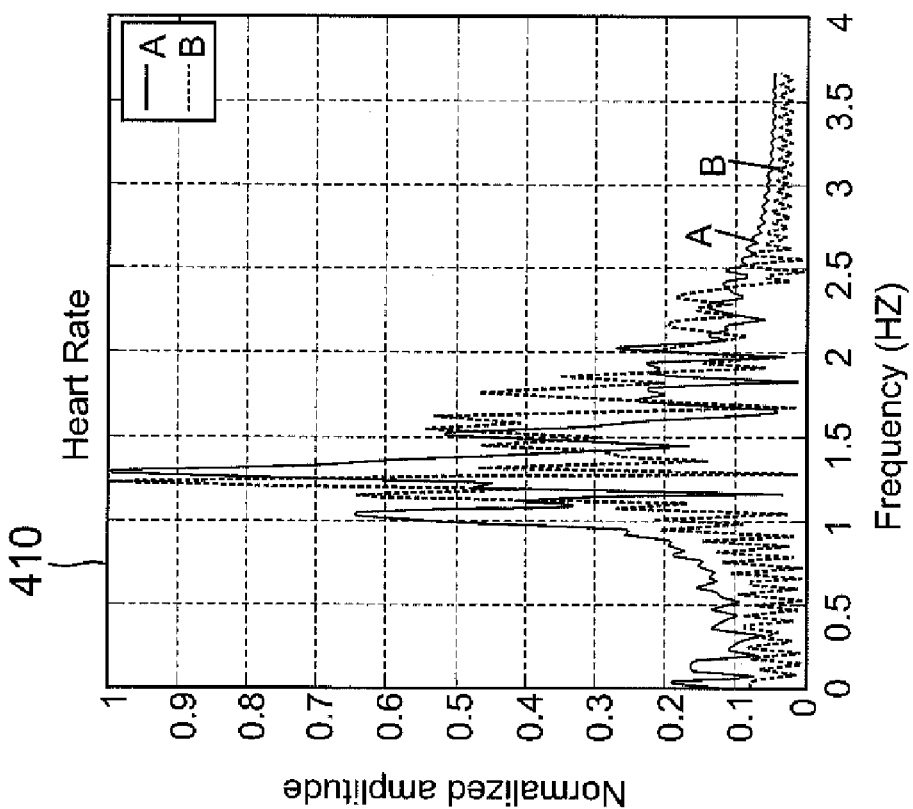

In order to extract the rate of the heartbeat—for example—system 100 may perform a frequency analysis (e.g., using FFT) along the time axis 406 on the signal at a distance along axis 404 from the radar unit 102 for which the signal is strongest (e.g., average signal), as indicated in FIG. 4A, occurring at 10 ft (on axis 404) from the radar unit for the particular example shown. The results of the FFT processing may be displayed by RF imaging system 100 as a frequency domain graph 410 such as shown in FIG. 4B. From the location of the highest peak shown in the graph 410, the frequency of the signal can be estimated and displayed as a number (in this example, approximately 1.3 Hz which is about 78 beats/minute).

FIG. 4B is a pair of signal strength graphs 410 and 420 illustrating a capability for discriminating heartbeat and respiration of live individuals using RF imaging system 100. Ultra-wideband sensors that operate in the 60 GHz range—such as radar units 102—can be accurate enough to discriminate a live person from a distance (e.g., within the surveillance range exemplified above) or from behind an obstacle (e.g., office wall 205). In FIG. 4B, graph 410 shows a frequency spectrum for heart rate and graph 420 shows a frequency spectrum for respiration rate for two different subject individuals A and B. For example, the plots may be produced from persons (subject A and subject B, also referred to as "targets") standing 1 foot from a six-inch-thick wall behind which are located radar detector units 1021 at approximately 2 feet away from the wall (e.g., wall 205).

Cardiac muscles and lungs periodically fluctuate and their movements typically have frequencies in the range of approximately 0.8 through 2.5 Hz (Hertz). Combined with recovered target size and shape information, heart rate and respiration rate may be used as indicators to differentiate between a live person, an animal or an object to reduce the occurrence of false alarms. For example, the particular profiles of frequencies seen in graphs 410, 420 for subjects A and B may be considered characteristic of human individuals. For example, in a test scenario lasting about 30 seconds, scanned reflection waveforms were captured at 7.3 Hz (e.g., time domain waveforms at center frequency of 60 GHz, pulsed at PRF between 1 to 10 MHz, and scanned at a scan repetition rate of 7.3 Hz), recorded, and analyzed. The time domain waveforms (such as that shown in FIG. 4A) of the scan data were re-shaped for motion (e.g., re-shaped for better detection of heart and respiratory motion) and low pass filtered and transformed to frequency domain to determine the peak frequency content in the range of approximately zero to 1.0 Hz for respiratory rate detection and about 0.8 to 2.5 Hz for heart rate detection. By comparing the scan data to the pre-determined profiles, system 100 may be used to differentiate between non-moving and moving targets, and between animals and humans.

Figure 4C:
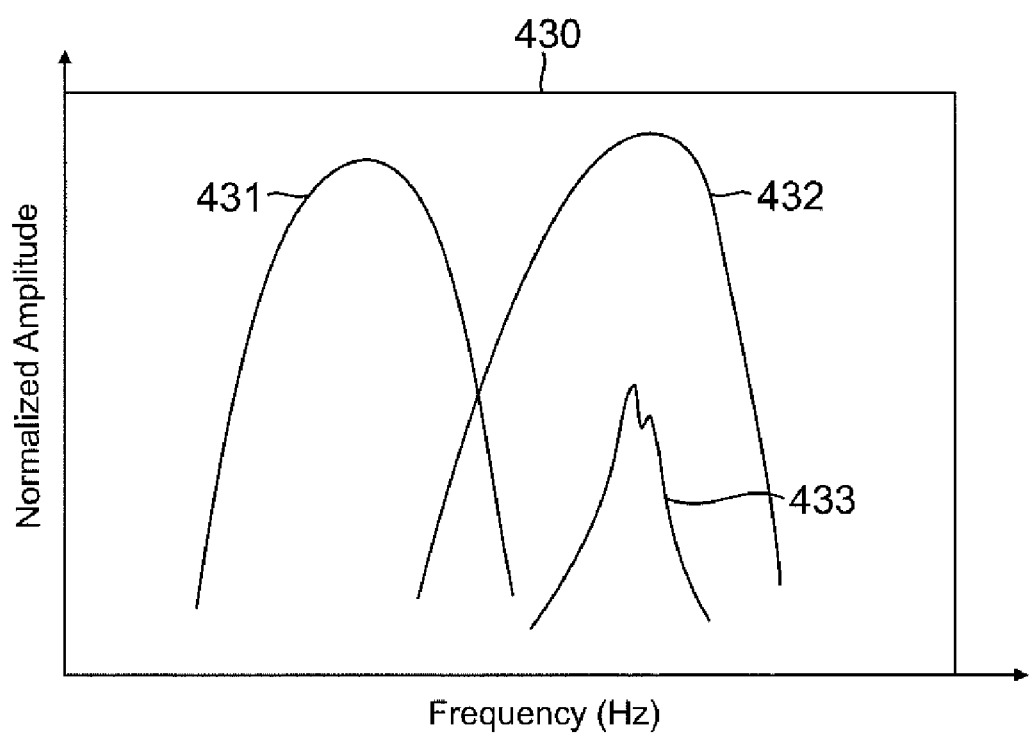
FIG. 4C is a frequency domain signal strength graph illustrating one example of capability for discriminating variable biometric data within and between differing species using an RF imaging system in accordance with an embodiment.

FIG. 4C is a frequency domain signal strength graph 430 illustrating one example of capability for discriminating variable biometric data within and between differing species using an RF imaging system 100. Frequency profile 431 may be, for example, a heartbeat profile having a signature (e.g. specific form or shape, such as the rounded shape indicated in FIG. 4C for illustration only) indicating a human target. If the target individual experiences an increase in pulse rate, the profile 432 may shift to the right on graph 430 as frequencies in the profile increase, but the profile may keep its characteristic human signature (e.g., the rounded shape of profile 432 is similar to that of profile 431). On the other hand, for a different species—such as a dog—the profile 433 may occur at roughly the same frequencies as that of the human at higher pulse rate (profile 432), as a smaller animal would generally have a higher pulse rate, but the signature of dog heartbeat profile 433 (e.g., more pointed and less area beneath the graph in the example shown for illustration in FIG. 4C) may be markedly different from the signature of human heartbeat profile 431, 432. Although, heartbeat is used for illustration, system 100 may be capable of using respiration profiles or any other biometric characteristics detectable as movement.

Figure 5:
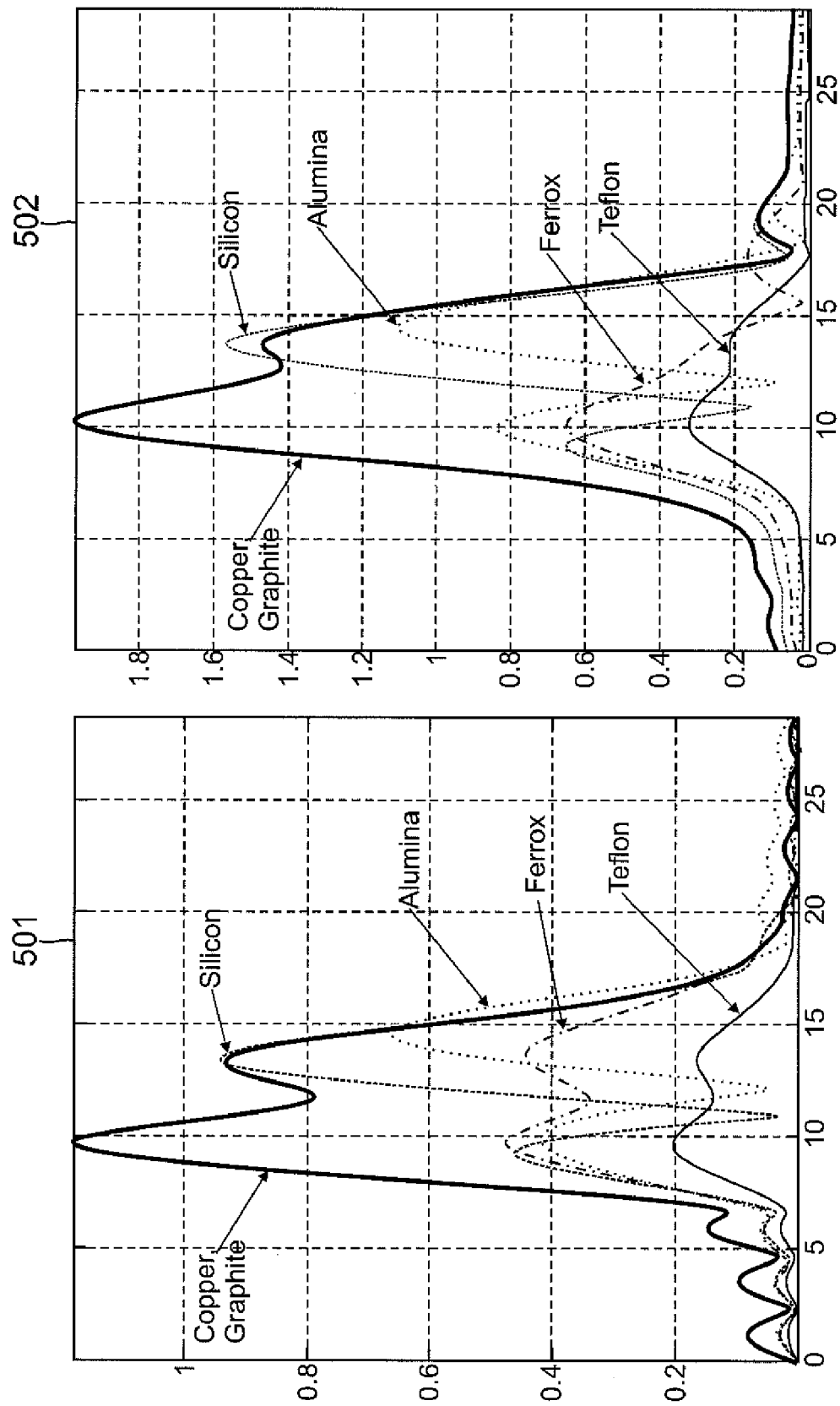
FIG. 5 is a set of signal strength graphs illustrating a capability for discriminating some examples of types of inanimate objects by an RF imaging system in accordance with an embodiment.

FIG. 5 is a set of signal strength graphs 500 illustrating a capability for discriminating some examples of types of inanimate objects by an RF imaging system 100. FIG. 5 illustrates the effectiveness of frequency domain analysis (e.g., using FFT) applied directly to target reflections for different materials. In FIG. 5, plot 501 shows the spectrum of reflected pulses transmitted by a radar unit 102 at a distance of 30 centimeters (cm) from an inanimate target, and plot 501 shows the spectrum of reflected pulses at a distance of 46 cm. As may be seen from plots 501, 502, there are distinct signatures (e.g., distribution of frequencies) in the spectrum depending on the specific material (as indicated in FIG. 5) and independent of the interrogator (e.g., radar detector unit 1021) distance from the target. Plots 501, 502 were produced using an excitation source (e.g., radar detector unit 1021) transmitting short duration ultra-wide band pulses, for example, 100 pico-second bipolar pulses at 15 GHz band width, and reflecting waveforms off a flat enclosure placed at 30 cm (for plot 501) and 46 cm (for plot 502) distance from the excitation source. Data was recorded and its spectrum was computed. Various materials (e.g., copper graphite, silicon, alumina, Ferrox™, and Teflon®) were used as the enclosure and analyzed independently. When a short duration ultrawide band pulse is reflected from a target, the return signal is changed both in amplitude and waveform. Each target (e.g., copper graphite, silicon, alumina, Ferrox™, and Teflon®) has a unique effect (signature) on the reflected signal. Spectral analysis of the returned waveform may be employed to classify certain types of targets. The technique can be effectively applied, for example, to classification of concealed weapons under interrogation (e.g., surveillance using system 100) by identification of unique signature of a weapon. In addition, application of bi-spectral or higher order spectral processing may allow suppression of noise while preserving phase information.

Figure 6:
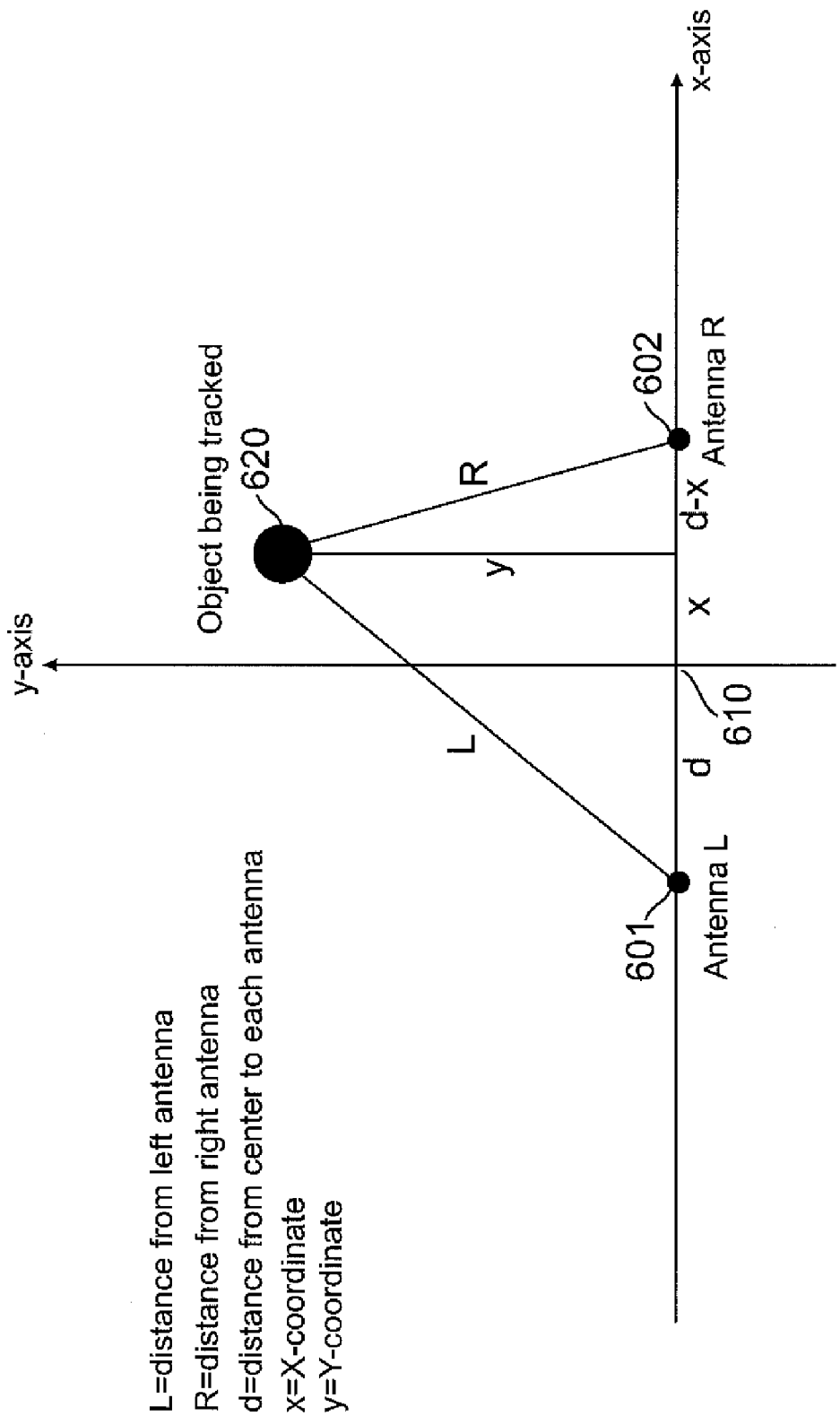
FIG. 6 is a diagram illustrating motion detection and tracking by an RF imaging system in accordance with an embodiment.

FIG. 6 shows parameters used for motion detection and tracking by an RF imaging system 100. As described above, display 300 may show the position and a trace or track of the changing positions of the target relative to the locations of Unit 1 and Unit 2 sensors 1021. The locations of Unit 1 sensor 1021 is shown in FIG. 6 as location 601 and the location of Unit 2 sensor 1021 is shown in FIG. 6 as location 602. A distance d, shown in FIG. 6, may be determined as half the distance between locations 601 and 602 so that an origin 610 for an x-y coordinate system (labeled in FIG. 6 by "x-axis" and "y-axis") may be located midway between locations 601 and 602 and oriented according to the positions of Unit 1 and Unit 2 sensors 1021, i.e., locations 601 and 602. The target position is shown in FIG. 6 as position 620, located at (x, y) from origin 610. The distance d–x is also shown in FIG. 6 along the x-axis. The target position 620 is located a distance L from location 601 (labeled Antenna L). The target position 620 also is located a distance R from location 602 (labeled Antenna R).

The following formulas may be derived from FIG. 6:

$$(d+x)^2 + y^2 = L^2 \quad (1)$$

$$(d-x)^2 + y^2 = R^2 \quad (2)$$

$$d^2 + 2dx + x^2 + y^2 = L^2 \quad (3)$$

$$d^2 - 2dx + x^2 + y^2 = R^2 \quad (4)$$

Subtracting (4) from (3) yields the x coordinate of target position 620:

$$x = (L^2 - R^2)/4d \quad (5)$$

Then the y coordinate of target position 620 can be computed using:

$$y = \text{square\_root}(L^2 - (x+d)^2) \quad (6)$$

It may noted that the above formulas are also valid in case x<0, or in other words when L<R. The above provides a simplified example restricted to two dimensions, e.g., x and y, and it may be apparent to one of ordinary skill in the art that the above can be extended to three dimensions (e.g., x, y, and z). For example, a z-axis may be provided through origin 610 and appropriate formulas may be derived for locating the height of target position 620.

Figure 7:
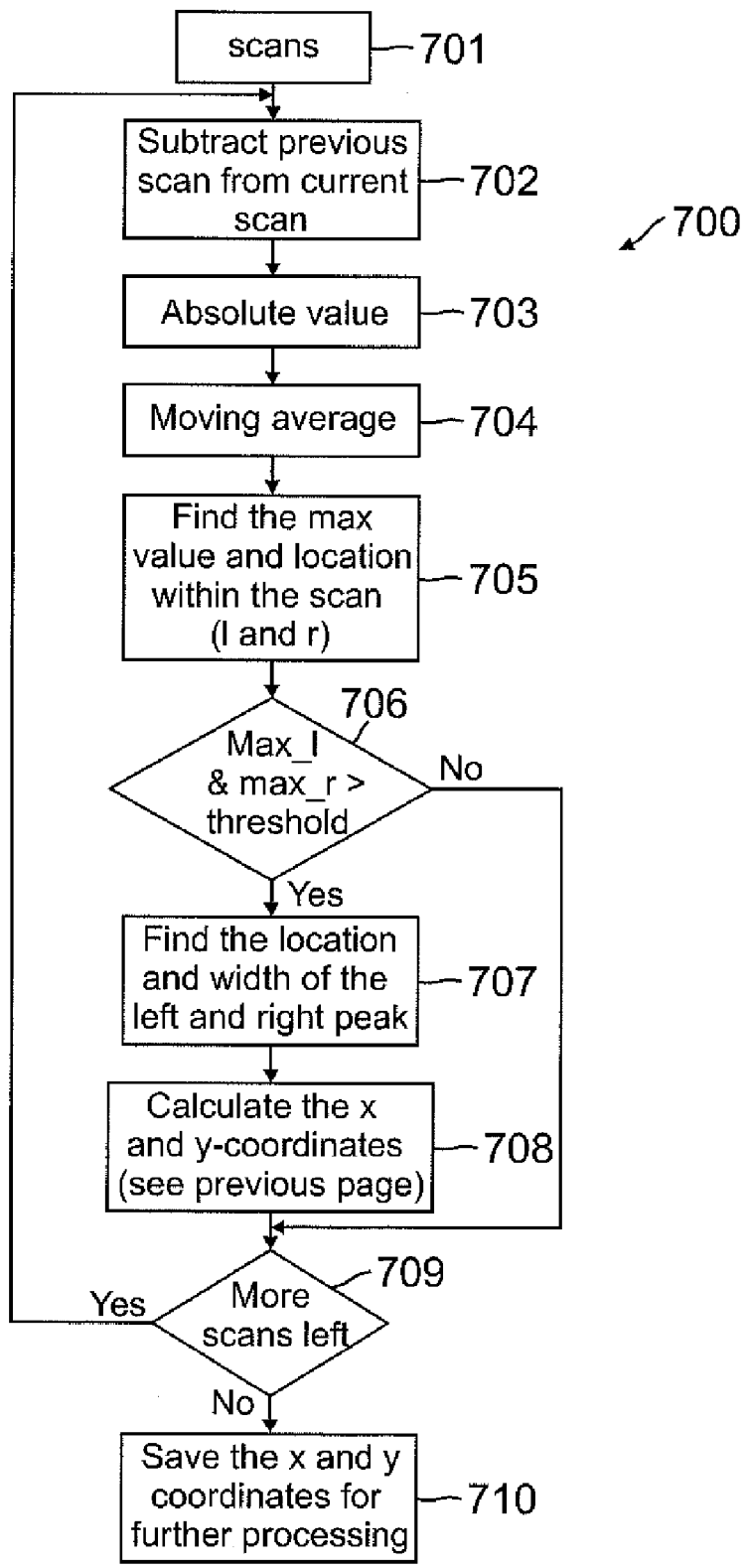
FIG. 7 is a flowchart illustrating a method for motion detection and tracking by an RF imaging system in accordance with an embodiment.

FIG. 7 illustrates a method 700 for motion detection and tracking by an RF imaging system 100. At step 701 radar scans may be provided to a processor—such as an application specific integrated circuit (ASIC)—for processing to determine target position, e.g., target position 620, and target movement, e.g., change of location of target position 620. The scans may include, for example, reflected waveforms from both Unit 1 (left) and Unit 2 (right) sensors 1021, and the processing of method 700 may be applied to both left and right waveforms or scans. A plurality of scans may be provided sequentially so that time position in the sequence may be referred to. For example, one scan may be previous or subsequent to another, and there may be a scan which is currently being processed. In addition, scans may be correlated before processing of the scans for motion detection begins at step 702.

At step 702, the previous scan provided at step 701 is subtracted from the current scan, e.g. step 702 may be regarded as a differentiator. Alternatively, the step 702 differentiator may be performed by subtracting a reference or background signal from each scan. In another alternative, the step 702 differentiator may be performed by first creating a slowly varying background signal by low-pass filtering the scans (e.g., taking a moving average) and then subtracting this background signal from each scan. At step 703, an absolute value of the result of the differentiator 702 may be computed. At step 704, a moving average of the results of step 703 may be kept as time or the sequence of scans progresses. At step 705, the maximum value and location within the scan may be found, to provide values for L and R, referring to FIG. 6. At step 706, comparison of the maximum values from step 705, e.g., max_L and max_R, are made to a pre-determined threshold value. If the maximum values exceed the pre-determined threshold processing may continue at step 707. If the maximum values do not exceed the pre-determined threshold processing may continue at step 709.

At step 707, the locations and widths of the left peak (from left waveform scans, e.g., provided by Antenna L of Unit 1 at location 601) and the right peak (from right waveform scans, e.g., provided by Antenna R of Unit 2 at location 602) may be found. In an alternative embodiment, the width of the peaks may be used to determine the size of the object, e.g., target position 620, being tracked. At step 708, x and y coordinates of target position 620 may be calculated, for example, using equations (5) and (6). Coordinates may be provided, for example, in three dimensions (e.g., x, y, and z) even though the example provided here uses only two dimensions for simplicity of illustration. At step 709, it is determined whether any scans from step 701 remain to be processed and, if so, processing returns to continue at step 702. Otherwise processing continues at step 710, where the coordinates, e.g., x and y or x, y, and z, of target 620 may be saved for further processing. For example, the coordinates may be used to display the current position of the target, e.g., target position 620, on display 301. Also, for example, the coordinates may be used to update the display of target tracking on display 302.

Embodiments described herein illustrate but do not limit the disclosure. It should also be understood that numerous modifications and variations are possible in accordance with the principles of the present disclosure. Accordingly, the scope of the disclosure is best defined only by the following claims.

We claim:

1. A system comprising:
    a plurality of radar units configured to provide scan data samples to a network;
    a signal processing and imaging module connected to the network and configured to:
        receive the scan data samples of a target;
        extract biometric data from the scan data samples using frequency analysis, including using Fast Fourier Transform (FFT) along a time axis at a distance, from each of the plurality of radar units, for which the signal is strongest; and
        determine a type of the target based on a pre-determined radar profile signature; and
    a display unit in communication with the signal processing and imaging module and configured to provide a tracking display of the target position and type.

2. The system of claim 1, wherein the signal processing and imaging module is further configured to:
    extract target material composition data from radar pulse reflections used to provide the scan data samples using frequency analysis applied directly to the radar pulse reflections.

3. The system of claim 1, wherein the signal processing and imaging module is further configured to:
    determine target movement; and
    provide target movement tracking information to the display unit.

4. The system of claim 1, wherein:
    the signal processing and imaging module is further configured to:
        determine target movement; and
        provide target movement tracking information to the display unit; and
    the display unit is further configured to provide the tracking information as a trace of target movement.

5. The system of claim 1, wherein the signal processing and imaging module is further configured to determine the type of the target based on a pre-determined radar signature profile using classification of amplitude peak frequencies that vary from species to species.

6. The system of claim 1, wherein the signal processing and imaging module is further configured to distinguish a human target as the type of target based on a heart rate profile.

7. The system of claim 1, wherein the signal processing and imaging module is further configured to distinguish a human target as the type of target based on a respiratory rate profile.

8. The system of claim 1, wherein the signal processing and imaging module is further configured to distinguish an inanimate object as the type of target based on a type of material signature profile.

9. A method comprising:
scanning an inhabitable area using a plurality of radar detector units to produce scan, data samples of a target in the inhabitable area;
processing the scan data samples to extract biometric data from the scan data samples using frequency analysis, including using Fast Fourier Transform (FFT) along a time axis at a distance, from each of the plurality of radar units, for which the signal is strongest;
using frequency profile information recovered from the target to differentiate between a live person, an animal, or an object as the target type; and
displaying the target type and position on an image display.

10. The method of claim 9, wherein using recovered information comprises:
using target size, target shape, heart rate, and respiratory rate as indicators to differentiate between a live person, an animal, or an object.

11. The method of claim 9, further comprising:
extracting material composition data from the target from radar pulse reflections used to provide the scan data samples using frequency analysis applied directly to the radar pulse reflections.

12. The method of claim 9, wherein processing the scan data further comprises:
transforming the scan data into a frequency domain profile to recover information from a target in the inhabitable area.

13. The method of claim 12, wherein processing the scan data further comprises:
comparing the frequency domain profile to a pre-determined frequency profile.

14. The method of claim 9, further comprising a step of:
locating the radar detector units behind a wall from the inhabitable area.

15. The method of claim 9, further comprising steps of:
communicating via a wireless network between the radar detector units and the image display.

* * * * *